United States Patent [19]

Feller et al.

[11] Patent Number: 4,679,472
[45] Date of Patent: Jul. 14, 1987

[54] METHOD AND APPARATUS FOR MACHINING THE CIRCUMFERENCE OF OUT-OF-ROUND WORKPIECES, PARTICULARLY PISTON RINGS

[75] Inventors: Otto Feller, Leichlingen; Manfred Brocksieper, Hückeswagen; Rolf Lückger, Cologne, all of Fed. Rep. of Germany

[73] Assignee: Goetze AG, Burscheid, Fed. Rep. of Germany

[21] Appl. No.: 809,871

[22] Filed: Dec. 17, 1985

[30] Foreign Application Priority Data

Dec. 22, 1984 [DE] Fed. Rep. of Germany ....... 3447234
Dec. 7, 1985 [DE] Fed. Rep. of Germany ....... 3543407

[51] Int. Cl.$^4$ .......................... B23B 5/26; B23B 5/24
[52] U.S. Cl. ........................................ 82/19; 82/2 B
[58] Field of Search ............... 82/2 B, 18, 19; 51/88, 51/89, 101; 29/156.6, 156.63; 409/166, 199

[56] References Cited

U.S. PATENT DOCUMENTS

| 2,782,669 | 2/1957 | Brandenberger | 82/19 |
|---|---|---|---|
| 2,791,927 | 5/1957 | Muller | 82/19 |
| 2,803,226 | 8/1957 | Renoux | 82/19 |
| 2,932,227 | 4/1960 | Koch et al. | 82/19 |
| 3,057,235 | 10/1962 | Mey | 82/19 |
| 3,621,617 | 11/1971 | Muller | 82/19 |
| 4,250,779 | 2/1981 | Feller et al. | 82/18 |

FOREIGN PATENT DOCUMENTS

| 1045204 | 11/1958 | Fed. Rep. of Germany | 82/19 |
|---|---|---|---|
| 1043015 | 4/1959 | Fed. Rep. of Germany | |
| 2006760 | 8/1971 | Fed. Rep. of Germany | |
| 2427826 | 2/1976 | Fed. Rep. of Germany | |
| 2732354 | 2/1979 | Fed. Rep. of Germany | 82/18 |
| 301081 | 11/1954 | Switzerland | |
| 444805 | 3/1936 | United Kingdom | |
| 515913 | 12/1939 | United Kingdom | |
| 710897 | 6/1954 | United Kingdom | |
| 894396 | 4/1962 | United Kingdom | |
| 2125716A | 3/1984 | United Kingdom | |

Primary Examiner—Nicholas P. Godici
Assistant Examiner—Jerry Kearns
Attorney, Agent, or Firm—Spencer & Frank

[57] ABSTRACT

Machining the circumferences of workpieces, particularly piston rings, in a variety of out-of-round contours and diameters requires only a single copying disc having a basic out-of-round contour. The copying disc is driven in synchronism with the angle of rotation alpha of piston rings to be machined by a direct current servomotor and, in order to generate the desired out-of-round contour, is caused to deviate from its synchronous movement by pulses received from a computer for the leading and lagging difference angles of rotation delta phi. An adjustable coupling member is provided between a copying disc sensor (such as a double lever) and the tool holder for transferring the out-of-round contour from the copying disc to the workpiece.

21 Claims, 6 Drawing Figures

METHOD AND APPARATUS FOR MACHINING THE CIRCUMFERENCE OF OUT-OF-ROUND WORKPIECES, PARTICULARLY PISTON RINGS

BACKGROUND OF THE INVENTION

The invention relates to a method for machining the circumference of out-of-round workpieces, particularly piston rings and preferably piston rings in packets, having different out-of-round contours and rated diameters by series. More particularly the invention relates to a machining method in which, starting from a basic out-of-round contour with reference to a defined ring diameter, the angle of rotation of the piston ring packet to be processed can be varied so as to produce a defined out-of-round contour which deviates from the basic contour by a difference angle of rotation which leads or lags per revolution. The invention also relates to an apparatus operating according to the method and including a copying device in the form of a rotationally driven copying disc having a basic out-of-round contour as well as a mechanism composed of a dual lever for transferring the out-of-round contour from the copying disc to a tool holder mounted so as to be radially displaceable relative to the axis of the workpiece, with the copying disc as well as the workpiece packet being driven by synchronously running servomotors.

An apparatus for machining the circumference of piston ring packets having out-of-round outer and inner circumferences, as disclosed in German Patentschrift No. 1,043,015, comprises a tool holder in the form of a double rocker which is moved, through the intermediary of a sensing roller and a twin-lever mechanism, by a copying disc which rotates in synchronism with the piston ring circumference. In this apparatus, the copying device is designed so that a separate copying disc is required for each out-of-round contour and, when the twin-lever rocker is set to the piston ring diameter of a different series, the transmission ratio of the double lever inevitably remains unchangeable.

Based on the requirement that a piston ring, when installed in an engine, must lie against the cylinder wall with a defined radial pressure distribution and in a light slit tight manner, and based on the use of different piston ring materials because of extremely varied friction and thermal stresses, the major problem is the multitude of different out-of-round contours required for which a corresponding number of interchangeable copying discs must be held available.

Even if today these copying discs are calculated by electric computers, with respect to a certain basic diameter, by means of bending formulas for open rings, and the transfer of the calculated contours to the copying discs by NC controlled grinding machines is possible, the costs for manufacture and exchange of copying discs are not insignificant.

Frequently this circumstance results in the piston ring not being given the optimum configuration, but receiving the out-of-roundness of an existing copying disc which comes closest to the respective requirement.

Since various electronic control systems, such as, for example, the CNC control, have been developed in the course of progressive automatization of machine tools, the possibility exists of using such control systems when machining the circumferences of piston rings. Accordingly, the control values are fed from the memory of an electronic control to the setting and driving motors of the machine. Additionally, with the aid of appropriate measuring devices, the control values are constantly adapted by way of a comparison of the actual dimensions with the intended desired dimensions.

German Offenlegungsschrift (Laid-Open Application) No. 2,006,760 and German Patentschrift No. 2,732,354 relate to such out-of-round turning devices, in which the turning tool can be adjusted radially as a function of the angle of rotation of a workpiece which rotates together with the work spindle. The tool displacement for out-of-round machining of piston rings amounts to twice a full stroke from zero to a maximum value per revolution of the piston ring packet. Direct current servomotors and ball groove thread spindles, the latter being highly endangered by excessive wear, are used to displace the tool. Since the angular acceleration capability of an individual servomotor does not meet the requirements of modern metal cutting technology, attempts are being made to increase the acceleration capability by means of series or parallel connected servomotors.

German Patentschrift No. 2,427,826 relates to a device for the out-of-round turning by copying for numerically controlled lathes, with the rear end of the tool holder being supported in and by a cam which is rotatably mounted on an upper carriage and is included in the numerical control. The three-dimensional cam (copying discs), which is mounted in bearing blocks and is very difficult to manufacture, has not only one, but a plurality of out-of-round contours, corresponding practically to a plurality of juxtaposed copying discs. Although the rotary drive for the cam may be provided with a fixed, adjustable transmission ratio with respect to the revolution of the workpiece, such as, e.g. a ratio of 1:1, 1:2, etc., the cam rotates always at the same angular velocity.

SUMMARY OF THE INVENTION

It is the object of the present invention to provide a method and an apparatus operating according to the method for machining the circumference, particularly of piston rings having extremely varied out-of-round contours and rated diameters, with the production and exchange of always new copying discs being eliminated, with the metal cutting output being adapted to the most recent state of the art, with optimum quality standards being realized, and with set-up and non-productive times being limited, except for the exchange of tools, to selecting and setting values on the front panel of the control device.

This is accomplished by the invention with a method which is characterized in that initially the desired out-of-round contour to be produced on the piston ring is converted, by multiplication with a correction factor to the maximum deviation from the circular shape (amplitude) of the path curve of the basis contour and to the out-of-round contour to be produced which deviates from the basic contour, and then the different angle values between the base contour and the recalculated out-of-round contour are determined and stored so as to be available for call-up by codes.

In this way it is possible to design a machine which includes a copying device that has only a single copying disc laid out on the basis of a basic out-of-round contour on a defined average ring diameter and, as provided in the prior art, can be driven by a servomotor or the like at the angle of rotation of the piston ring packet.

To produce respectively desired out-of-round contours which deviate from the basic out-of-round contour depending on the piston ring diameter and the desired radial pressure distribution when installed in an engine, control pulses are calculated as difference angle values which permit positive lead or lag of the drive for the copying disc or the workpiece packet. This means that the differences between the path curve of the basic copying disc and the path curve of the desired out-of-round contour to be produced, in each case with reference to an average basic diameter, are utilized to determine the amount of lead and lag, respectively, which are then stored and available for call-up by codes, with the path curve of the out-of-round contour to be produced having previously been brought, by multiplication with a correction factor, to the same maximum deviation from the circular shape (amplitude) as the basic copying disc.

In this connection, it is conceivable for the correction factors required for the recalculation to be stored for call-up, so that selecting of the code number for the out-of-round contour to be produced, after having previously selected the desired rated diameter, causes the transmission ratio of the copying device to be set automatically.

All preselected and used values are displayed on digital displays equipped with correction keys so that adaptations can always be made upon a comparison between the desired and actual values.

A machine operating according to the above-described method is characterized, according to the invention, in that the stator of the servomotor driving the copying disc or the workpiece packet is rotatably mounted and controlled by the respective leading or lagging angle difference values.

As an alternative or additionally, the machine may be designed, according to the invention, so that the point of contact between the double lever and the tool holder can be displaced in the direction toward the double lever arm. This means that a change in the transmission ratio of the double lever which transfers the out-of-round contour from the copying disc to the tool holder, converts the basic out-of-round contour of the copying disc to a different out-of-round contour to be realized on the workpiece.

The purely electronic influence on the angle of rotation as well as electromechanical changes of the transmission ratio result in savings in otherwise required exchangeable copying discs. In practice, the combined use of both solutions appears to be particularly advantageous.

Within the scope of further features of the invention, it is proposed that a slide for accommodating a coupling member lying at the lever arm of the double lever and at the tool holder is disposed between the lever arm of the double lever and the tool holder, with such slide being adjustable by means of a servomotor. The use of a slide having an integrated coupling member permits the placement of the servomotor outside the vibrating transfer mechanism so that the moved mass of the latter is not unnecessarily increased.

Advantageously the coupling member is composed of a ram whose frontal faces cooperate, on the one hand, with the lever arm of the double lever and, on the other hand, with the tool holder.

In principle, the configuration of the tool holder is insignificant for the placement of an adjustable coupling member, preferably in the form of a slide having an integrated ram. The tool holder may be the transverse carriage of a lathe, cutter or the like on which the ram acts against the pressure of a reset spring. In another known out-of-round lathe (German Patentschrift No. 2,732,354) the tool holder is composed of a twin-lever rocker, with the ram, as the coupling member according to the invention, resting against one lever arm of this twin-lever rocker, while the other lever arm, including the boring bar connected therewith, supports the tools for the simultaneous external and internal machining of the piston ring packet. In this case, it is of advantage to design the end of the ram lying at the lever arm of the transfer double lever as a sensor tip and the end of the ram lying at the lever arm of the twin-lever rocker as a plate, with the plate cooperating with the sensor tip of the twin-lever rocker. Thus, distortion in transfer between the ram and the two lever arms is avoided when points of contact travel on respectively different circular arcs during the pivoting movement.

While the ram guided in the slide lies slidingly against the double lever and against the twin-lever rocker during the transfer of the out-of-round contour, due to the pivoting movement of the double lever and the twin-lever rocker, a further idea of the invention proposes to configure the coupling member as a rolling element, preferably of cylindrical shape. The rolling element may be positioned in a fork-shaped slide which is moved by a setting motor. It is also conceivable, however, to suspend the rolling element from an adjustable height rod. To be able to follow the slight displacement movements in dependence on the out-of-round contour to be transferred, the rod itself may be made of spring steel or may be mounted so as to be pivotal about an axis.

DESCRIPTION OF THE PREFERRED EMBODIMENTS

Figure 1:
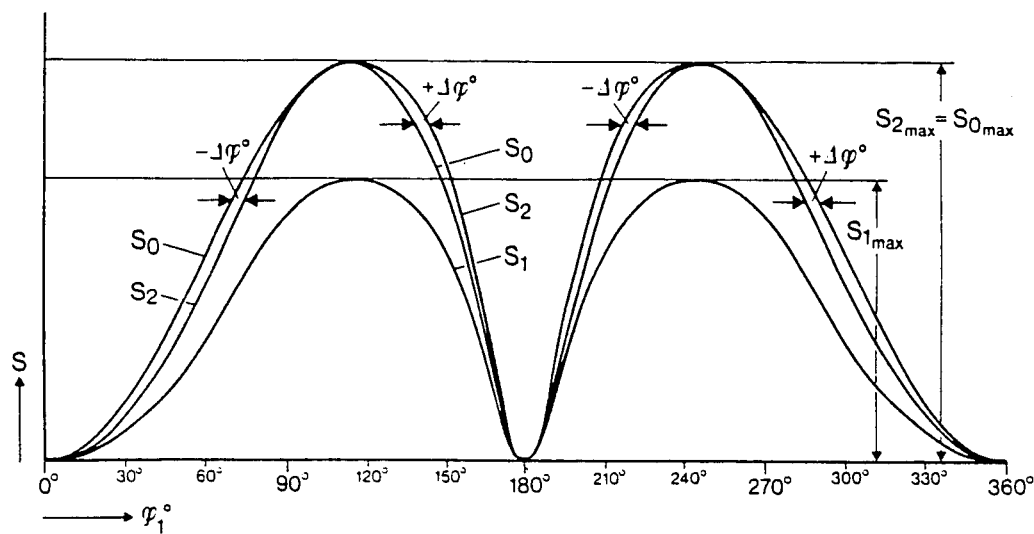
FIG. 1 is a graph illustrating path diagrams of the tools during the out-of-round working of piston rings.

The diagrams shown in FIG. 1 show path curves performed by the processing tools during the manufacture of piston rings having a diameter, for example, of 150 mm. In this figure, curve $S_0$ represents the path curve of the basic copying disc. Curve $S_1$ represents a path curve determined with the aid of bending formulas for open rings for the out-of-round contour to be produced at the piston ring. Although both curves are similar, their paths differ in their maximum deviation from circular (amplitude).

The method according to the invention now resides in that path curve $S_1$, which is plotted from individual values for every 0.5° rotation angle, is multiplied by a correction factor X to thus obtain $S_{2max} = S_{0max}$. The factor used for X in the diagram is 1.4.

The horizontal difference values between $S_2$ and $S_0$ now appearing in the diagram represent the lead and lag angle delta phi° of the rotation angle by which the copying disc (FIG. 2) 9 must deviate from its synchronous path with respect to the piston ring packet 1. These values determined for delta phi° are stored and coded in the computer in a known manner for each out-of-round shape so that they can be called up.

The computer 50 now forms the reciprocal of factor X as used in preparation for the difference value formation and this value is stored to be called up as 1/150 X, with 150 being the average rated piston ring diameter considered in the basic contour.

After selecting the code number of the out-of-round contour to be produced with the decade switch 40 and preselecting the desired truing diameter with decade switch 41, setting motor 19 performs the truing diameter simultaneously with setting motor 16 setting the copying lever length multiplied by the correction factor and these are displayed on digital displays 42 and 43.

Figure 2:
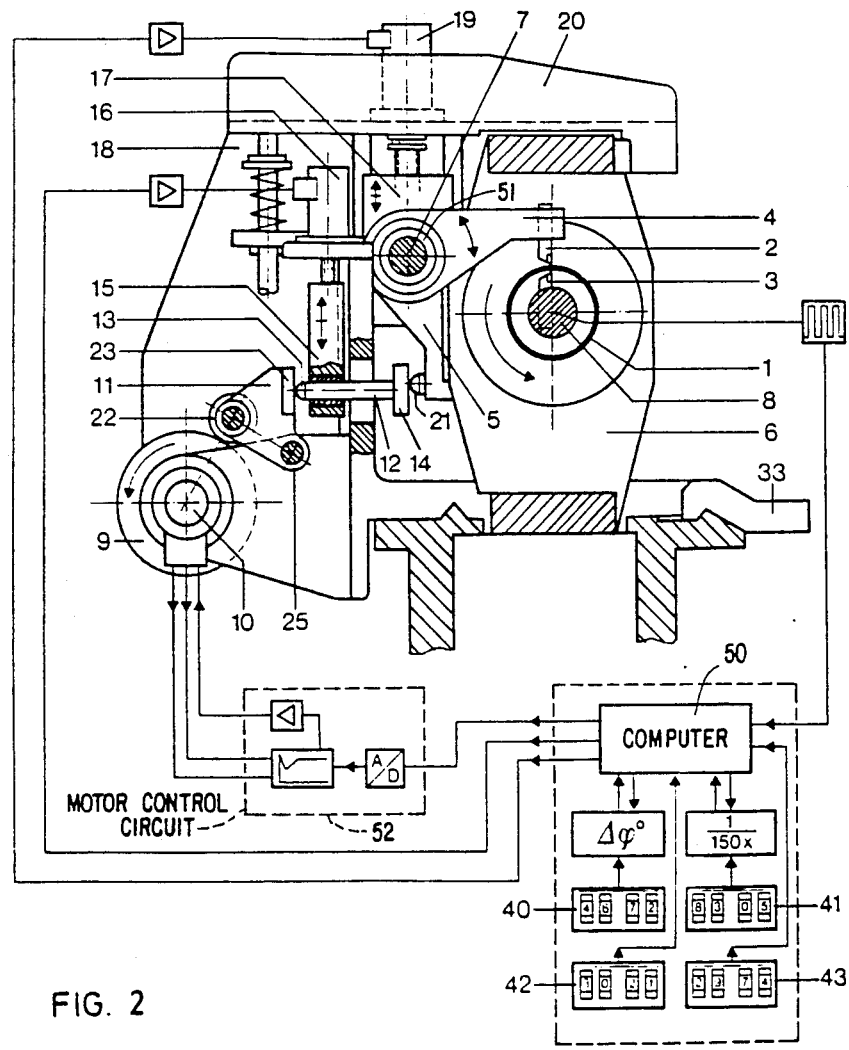
FIG. 2 is a side view of an embodiment of the invention, and illustrates a lathe together with a block circuit diagram.

FIG. 2 is a side view of a copying lathe for piston rings together with the block circuit diagram for its electronic control. The tool holder for the lathe tools 2 and 3 machining for the piston ring packet 1 externally and internally is a twin-lever rocker 51 of which only lever arm 4 carrying the outer cutting tool 2 and lever arm 5 charged by the ram 12 are visible. The double lever (not illustrated) carrying the boring bar 8 with inner cutting tool 3 lies behind yoke 6 in congruence with lever arms 4 and 5. The twin-lever rocker 51 is pivotally mounted on rocker bar 7, which itself is disposed to be upwardly and downwardly displaceable in stand 18 by means of longitudinal carriage 17.

To produce the out-of-round contour, the twin-lever rocker 51 and the lathe tools 2 and 3 perform a pendulum movement generated by the copying disc 9 which rotates in synchronism with the piston ring packet 1. This pendulum movement is transferred via the double lever 11, which is provided with a sensing roller 22 and a slide face 23 and which rotates around bolt 25, and via ram 12, which is provided with a sensor tip 13 and a pressure plate 14, to sensor tip 21 on lever arm 5 of the twin-lever rocker 51. The magnitude of the pendulum movement for the desired out-of-round contour to be produced at the piston ring packet 1 is determined by the stroke of the basic copying disc and the total lever ratio from the distances between the centers of rotation of 25 and 22 and the distance between the center of rotation 25 and sensor tip 13.

After selecting the truing diameter with decade switch (41), the value for the maximum deviation from circular (amplitude) associated with a certain truing diameter is multiplied by the correction factor 1/150 X and set by setting motor 16, which moves ram 15 and its transversely movable ram 12 up and down by means of a spindle drive (not illustrated). At the same time, the truing diameter is set by setting motor 19 fastened on traverse 20 and a spindle drive (not illustrated), thus moving the entire twin-lever rocker 51 and lathe tools 2 and 3 up or down without changing the originally set copying lever ratio. The drive for copying disc 9 will be described later.

Figure 3:
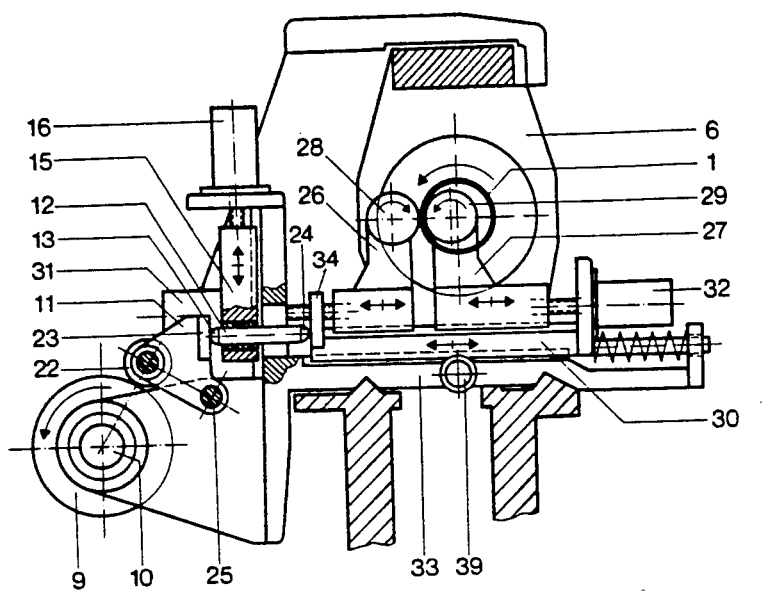
FIG. 3 is a side view of another embodiment, and illustrates a cutter.

FIG. 3 is a side view of another embodiment of the invention and illustrates a copying cutter for the simultaneous outer and inner machining of out-of-round piston rings.

Cutting carriages 26 and 27 with cutters 28 and 29 for working the piston ring packet 1 are guided in transverse slide 30. Carriages 26 and 27 are moved to the left or right by means of setting motors 31 and 32 equipped with spindle drives (not illustrated) so as to set the working diameter. The translatory movement of transverse slide 30, which is guided in transverse carriage 33 for the purpose of out-of-round working the piston ring packet 1, is effected by copying disc 9 via the double lever 11 equipped with a sensing roller 22 and a slide face (23) and by means of ram (22) provided with sensor tips 13 and 24. The movement of sensor tip 24 is transferred to slide face (34) of transverse slide 30.

Figure 4:
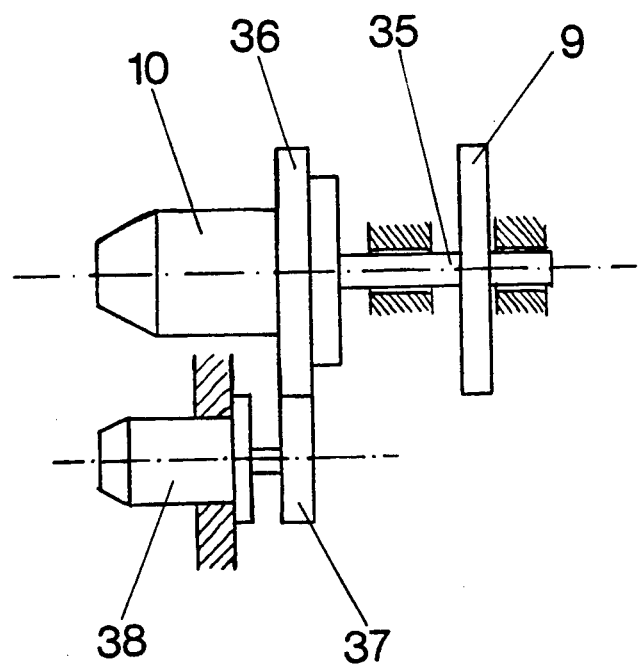
FIG. 4 is a schematic representation of the copying disc drive by means of a motor having a rotatably mounted stator.

The drive for copying disc 9, shown schematically in FIGS. 2 and 4, is effected by a motor 10 equipped with a d.c. servomotor 38 which receives, in a known manner, pulses provided by the computer 50 and a motor control circuit 52 to establish the lead and lag angles delta phi° (difference angles). The rotary movement is transferred by means of pinion 37 to provide rotary movement to the ring mount 36 of the stator (motor housing) of motor 10. Since the stator is not fastened but is able to rotate around the doubly mounted motor shaft 35, it is turned to the left and right to change the synchronous movement between piston ring packet 1 and copying disc 9 so as to generate the desired out-of-round contour.

Figure 5:
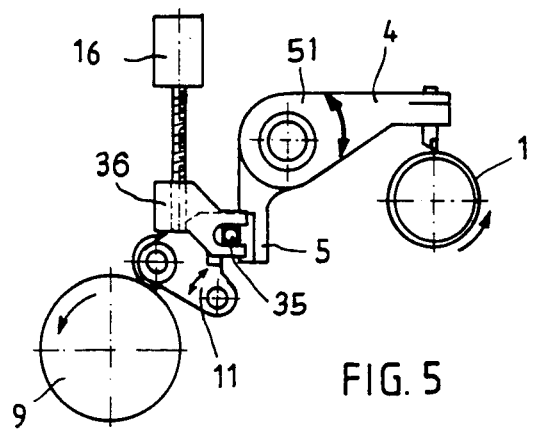
FIGS. 5 and 6 are basic sketches of the transfer mechanism with modified coupling members.

The embodiment shown in FIG. 5 essentially corresponds to the apparatus according to FIG. 2. However, instead of the ram 12, a roller bearing 35 in the form of a cylindrical roller is provided between double lever 11 and twin-lever rocker 51. The positioning of rolling bearing 35 is effected by means of a fork-shaped slide 36 whose height can be adjusted via setting motor 16.

Figure 6:
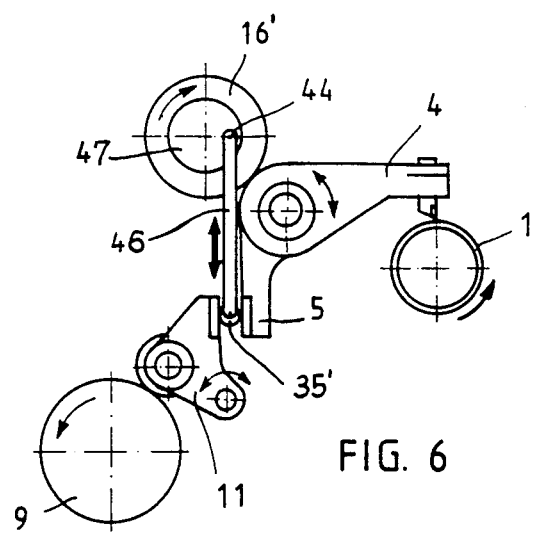

According to the alternative embodiment of FIG. 6, roller bearing 35' is suspended from a rod 46 which is adjustable in height at an elastomer disc 47 which can be caused to rotate by means of servomotor 16'. Rod 46 is pivotal so as to swing back and forth around its point of suspension (axis) 44.

The invention described here for the example of machining the circumference of out-of-round piston rings can also be used in the same manner for the out-of-round working of other annular bodies, such as, for example, synchronizer rings for transmissions.

What we claim is:

1. In an apparatus for machining the circumference of a workpiece to provide the workpiece with a predetermined out-of-round contour, the apparatus including a copying disc having a basic out-of-round contour, a first motor to rotationally drive the copying disc, a tool handler which is mounted to be radially displaceable relative to the workpiece axis, transfer means including a double lever for transferring the basic out-of-round contour to the tool holder, and a second motor running synchronously with the first motor to rotationally drive the workpiece, the improvement wherein:

the predetermined out-of-round contour deviates from the basic out-of-round contour of the copying disc by predetermined lead or lag difference angle values, wherein the stator or one of the motors is rotatably mounted, and wherein the apparatus further comprises means for controlling the rotary position of said stator of said one of the motors by the respective lead or lag difference angle values.

2. An apparatus according to claim 1, including means for supporting and rotating a packet of piston rings.

3. In an apparatus for machining the circumference of a workpiece to provide the workpiece with a predetermined out-of-round contour, the apparatus including a copying disc having a basic out-of-round contour, a first motor to rotationally drive the copying disc, a tool holder which is mounted to be radially displaceable relative to the workpiece axis, transfer means including a double lever for transferring the basic out-of-round contour to the tool holder, and a second motor running synchronously with the first motor to rotationally drive the workpiece, the improvement wherein:

the transfer means includes first means operationally connecting the double lever and the toold holder for conveying movement from the double lever to the tool holder along a direction of transfer, and second means for adjusting the position of the first means transversely to the direction of transfer;

wherein the double lever has a lever arm, wherein the first means comprises a coupling member lying against the lever arm of the double lever and the tool holder, and wherein the second means comprises a slide that is disposed between the double lever and the tool holder and that accommodates the coupling member, and a motor that adjusts the position of the slide;

wherein the coupling member comprises a ram; and wherein the tool holder comprises a twin-lever rocker having a first lever arm to mount a tool and having a second lever arm with a sensor tip to receive the displacing movement during transfer of the out-of-round contour, wherein the ram has an end lying adjacent the sensor tip of the second lever arm, and wherein the coupling member further comprises a plate disposed between the end of the ram and the sensor tip.

4. An apparatus according to claim 3, including means for supporting and rotating a packet of piston rings.

5. In an apparatus for machining the circumference of a workpiece to provide the workpiece with a predetermined out-of-round contour, the apparatus including a copying disc having a basic out-of-round contour, a first motor to rotationally drive the copying disc, a tool holder which is mounted to be radially displaceable relative to the workpiece axis, transfer means including a double lever for transferring the basic out-of-round contour of the tool holder, and a second motor running synchronously with the first motor to rotationally drive the workpiece, the improvement wherein:

the transfer means includes first means operationally connecting the double lever and the tool holder for conveying movement from the double lever to the tool holder along a direction of transfer, and a second means for adjusting the position of the first means transversely to the direction of transfer;

wherein the tool holder comprises a twin-lever rocker and the first means comprises a rolling element; and wherein the second means comprises an adjustable height rod on which the rolling element is suspended.

6. An apparatus according to claim 5, wherein the rod is composed of spring steel.

7. An apparatus according to claim 5, wherein the rod is mounted so as to be pivotal about an axis.

8. An apparatus for machining the circumference of a workpiece to provide the workpiece with a predetermined out-of-round contour, comprising:

a copying disc having a basic out-of-round contour;
first motor means for rotationally driving the copying disc;

second motor means, running synchronously with the first motor means, for rotationally driving the workpiece;

a tool holder which is mounted to be radially displacement relative to the workpiece axis; and transfer means, including a double lever, for transferring the basic out-of-round contour from the copying disc to the tool holder along a direction of transfer, the transfer means having a point of contact between the double lever and the tool holder which is adjustable transversely to the direction of transfer, the transfer means additionally including a coupling member, mounting means for holding the coupling member between the double lever and the tool holder, with the mounting means and the coupling member being detached from both the double lever and the tool holder, and third motor means for adjusting the position of the coupling member.

9. An aparatus according to claim 8, wherein the coupling member comprises a ram and the mounting means comprises a slide to hold the ram.

10. An apparatus according to claim 9, wherein the tool holder comprises a twin-lever rocker having a first lever arm to mount a tool and having a second lever arm with a sensor tip to receive the displacing movement during transfer of the out-of-round contour, wherein the ram has an end lying adjacent the sensor tip of the second lever arm, and wherein the coupling member further comprises a plate disposed between the end of the ram and the sensor tip.

11. An apparatus according to claim 8, wherein the tool holder comprises a twin-lever rocker, wherein the coupling member comprises a rolling element, and wherein the mounting means comprises a slide to hold the rolling element.

12. An apparatus according to claim 8, wherein the tool holder comprises a twin-lever rocker, wherein the coupling member comprises a rolling element, and wherein the mounting means comprises an adjustable height rod from which the rolling element is suspended.

13. An apparatus according to claim 12, wherein the rod is composed of spring steel.

14. An apparatus according to claim 13, wherein the rod is mounted so as to be pivotal about an axis.

15. An apparatus for machining the circumference of a packet of piston rings to provide the piston rings with a predetermined out-of-round contour, the packet of piston rings having an axis, comprising:

a copying disc having a basic out-of-round contour;
first motor means for rotationally driving the copying disc;
second motor means, running synchronously with the first motor means, for rotationally driving the packet of piston rings;
a tool holder which is mounted to be radially displaceable relative to the axis of the packet of piston rings; and
transfer means, including a double lever, for transferring the basic out-of-round contour from the copying disc to the tool holder along a direction of transfer, the transfer means having a point of contact between the double lever and the tool holder which is adjustable transversely to the direction of transfer, the transfer means additionally including a coupling member, mounting means for holding the coupling member between the double lever and the tool holder, with the mounting means and the coupling member being detached from both the double lever and the tool holder, and third motor means for adjusting the position of the coupling member.

16. An apparatus according to claim 15, wherein the coupling member comprises a ram and the mounting means comprises a slide to hold the ram.

17. An apparatus according to claim 16, wherein the tool holder comprises a twin-lever rocker having a first lever arm to mount a tool and having a second lever arm with a sensor tip to receive the displacing movement during transfer of the out-of-round contour, wherein the ram has an end lying adjacent the sensor tip of the second lever arm, and wherein the coupling member further comprises a plate disposed between the end of the ram and the sensor tip.

18. An apparatus according to claim 15, wherein the tool holder comprises a twin-lever rocker, wherein the coupling member comprises a rolling element, and wherein the mounting means comprises a slide to hold the rolling element.

19. An apparatus according to claim 15, wherein the tool holder comprises a twin-lever rocker, wherein the coupling member comprises a rolling element, and wherein the mounting means comprises an adjustable height rod from which the rolling element is suspended.

20. An apparatus according to claim 19, wherein the rod is composed of spring steel.

21. An apparatus according to claim 20, wherein the rod is mounted so as to be pivotal about an axis.

* * * * *